(No Model.)
E. DAVIS.
INKSTAND.
No. 605,177. Patented June 7, 1898.
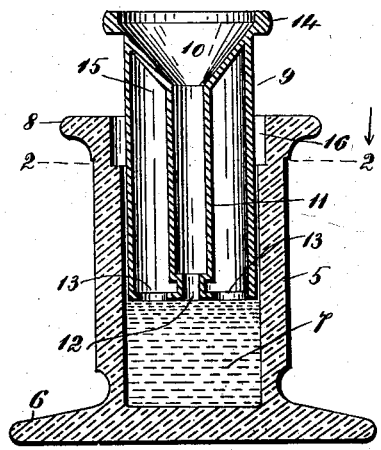
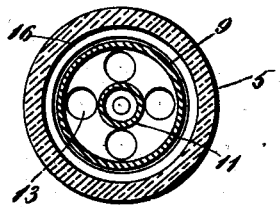
WITNESS
John Buckler
C. Gersh
INVENTOR
Emry Davis
BY
Edgar Tate
ATTORNEYS.
THE NORRIS PETERS CO., PHOTO-LITHO., WASHINGTON, D. C.

UNITED STATES PATENT OFFICE.

EMRY DAVIS, OF NEW YORK, N. Y.

INKSTAND.

SPECIFICATION forming part of Letters Patent No. 605,177, dated June 7, 1898.

Application filed June 19, 1897. Serial No. 641,487. (No model.)

*To all whom it may concern:*

Be it known that I, EMRY DAVIS, a citizen of the United States, residing at New York, in the county of New York and State of New York, have invented certain new and useful Improvements in Inkstands, of which the following is a full and complete specification, such as will enable those skilled in the art to which it appertains to make and use the same.

This invention relates to inkstands, and to that class thereof described and claimed in the following United States Patents granted to me: No. 399,844, dated March 19, 1889; No. 413,390, dated October 22, 1889, and No. 491,640, dated February 14, 1893; and the object of the invention is to provide an improvement on the form and style of inkstands covered by said patents and one which is more simple in construction and operation and also less expensive.

The invention is fully disclosed in the following specification, of which the accompanying drawings form a part, in which—

Figure 1 is a central vertical section of my improved inkstand, and Fig. 2 a section on the line 2 2 thereof.

In the drawings forming part of this specification the separate parts of my improvement are designated by the same numerals of reference in each of the views, and in the practice of my invention I provide an inkstand 5 which is cylindrical in form and which is provided with an enlarged base 6, and the inkstand 5 is provided with a reservoir 7, which is also cylindrical in form, and the upper end of said inkstand is provided with an annular flange or rim 8. I also provide a vertically-movable air-supported float which comprises a tube 9, which is adapted to move vertically within the reservoir 7 and the outer diameter of which is preferably slightly less than that of the diameter of said reservoir, and secured to or formed on the upper end of the tube 9 is a conical receptacle 10, the apex of which is directed inwardly and downwardly and provided with a tubular extension 11, which extends downwardly through the tube 9 and which is provided with a reduced extension 12, which passes through the bottom of the tube 9, and the bottom of said tube 9 is also provided with perforations or openings 13. The upper part of the conical receptacle 10 in the tube 9 is also provided with an outwardly-directed annular flange or rim 14, and the float consists of the outer tube 9, the inner tube 11, and the conical receptacle 10, with which said tube 11 is connected, and these parts may be formed integrally, and the lower end of the inner tube 11 need not necessarily be connected with the bottom of the tube 9, the only object in this connection being to properly support these parts and to provide openings in the lower ends of the tubes 9 and 11. As thus constructed an annular air-chamber 15 is formed in the float and the upper part of the reservoir is provided with an annular overflow-chamber 16.

The reservoir may be composed of any desired material, as may also the float; but said float, including the outer tube 9, the inner tube 11, and the conical receptacle 10, is preferably composed of hard rubber, and the upper end of the air-chamber 15 is hermetically sealed or closed in any desired manner.

The operation will be readily understood from the foregoing description when taken in connection with the accompanying drawings and the following statement thereof.

In the operation of the device the reservoir 7 may be first partially filled with ink and the float placed therein, and the float will be buoyed up by the air within the reservoir, and by applying pressure to the upper end thereof the ink will be forced up into the inner tube 11 and into the conical receptacle 10, and in practice the pen is dipped into the conical receptacle and the float depressed at the same time, so as to force the ink upwardly thereinto. In this operation the ink rises in the tube 11, but cannot rise to any considerable extent in the air-chamber 15, and as soon as the pressure is removed from the float the latter will again rise, as will be readily understood. Instead of removing the float, however, which is wholly optional and not necessary, the inkstand may be readily filled by simply pouring the ink through the conical receptacle 10, when the float rests on the bottom of the reservoir, whereupon as the ink fills the reservoir the float will rise until it reaches the desired height, according to the quantity of ink with which it is intended to charge the ink-well, the float being guided by the inner wall of the reservoir. It is to be noted that this simple way of filling the inkstand dispenses with all of the customarily necessary manipulation of the funnels or floats, unscrewing of covers, or regulation of air inflow or outflow, it being an essential objective function of this invention to simplify the operation of the inkstand equally with the simplification of the structure thereof.

It is to be understood that I do not claim, broadly, in this application the construction of the tubular float, which forms an element of my previous patents hereinbefore referred to, and particularly of Patent No. 491,640, granted February 14, 1893; nor do I claim, broadly, an overflow-chamber, the subject-matter of this application being the combination of such a float directly with the interiorly-cylindrical reservoir 5, whereby I dispense with intervening elements of construction and form a perfectly-operating inkstand which consists of two parts, it being noted that I dispense with an outer supply-reservoir and an interior feed-reservoir and combine said parts in one for the particular purpose of such a form of device which I have herein shown and that I fit the tubular float in direct engagement with the inner walls of the reservoir instead of providing the separate interior guide which the feed-reservoir of the aforesaid patent constitutes, whereby air was admitted to the ink from outside the float and a circumferential air-chamber formed, thereby necessitating the provision of means for equalizing or regulating the pressure of the air upon the ink at all times, and it will further be observed that the overflow-chamber 16 in this device is formed in the inner walls of the reservoir.

It is to be observed that the float is exteriorly cylindrical and formed so as to substantially occupy the interior of the reservoir before it is filled, and by this means not only is the device capable of being filled through the funnel, which automatically rises as the ink enters, but, moreover, the displacement of the float is such that by reason of the float occupying laterally the interior of the inkstand just sufficient ink is by such displacement of the float forced upwardly to form a film between the outside of the float and the inside or wall of the reservoir to seal the same against the ingress of air, so that in this device the height of the funnel is dependent solely upon the height of the ink within the reservoir.

It is further to be noted that by this invention I dispense with all the auxiliary mechanism and provide a two-part inkstand in which there are no covers, in which the reservoir is entirely open at the top, except for being closed by the float, as herein stated, and that these two parts are mutually detachable directly without manipulation.

In addition to these important advantages as respects the operation and the efficiency of my present inkstand it is further to be noted that, as the float is wholly within the reservoir, the two parts telescope together in a novel and commercially-convenient manner and that by reason of the externally as well as the internally cylindrical form of the reservoir and the presence of the base 6 and upper annular flange 8 said reservoir may be readily grasped and held in the hand, while the usual annular flange 14 upon the float rests upon the top of the reservoir when the device is empty and is the only part of the device which projects above the reservoir, and the ready handling, shipping, manipulation, cleaning, and filling of this device will be obvious.

Having fully described my invention, I claim as new and desire to secure by Letters Patent—

1. An inkstand comprising the combination of an exteriorly-cylindrical air-filled funnel-float centrally tubular, and an interiorly-cylindrical reservoir provided with a base, and in which the float closely fits to slidably engage the interior walls thereof, the said float being of a form and adapted to substantially wholly occupy the interior of said reservoir whereby air is excluded from said fluid other than through the center of the float, substantially as shown and described.

2. An inkstand formed of a cylindrical body or reservoir provided with a base 6, and an annular flange 8, at top in combination with an exteriorly-cylindrical float substantially occupying the interior of the reservoir and fitting wholly within the same, the said float being provided with an annular flange 14 at top adapted to rest upon and project above the flange 8 of the reservoir, and the said float being vertically movable in and freely removable from the said reservoir, substantially as shown and described.

3. In an inkstand, a reservoir consisting of a cylinder open at the top and provided with a closed lower end supported by a base, in combination with a funnel-float having exteriorly longitudinal and lateral dimensions and form approximately corresponding to those of the interior of the reservoir, substantially as shown and described.

4. In an inkstand, the combination with a reservoir having a uniform width at and upward from the bottom thereof, and open at the top throughout its width, of a centrally-tubular air-filled float having exterior longitudinal and lateral dimensions and form approximately corresponding to those of the interior of the reservoir, whereby the whole of said reservoir is occupied by the float, the said float normally resting upon the bottom of said reservoir and projecting above the top of the same, whereby it is adapted to deliver the ink from its lowest level, without the top of said float being movable below the top of the reservoir or below the ink at its highest level, and the delivery of said float being wholly from the center thereof, said float fitting closely in the reservoir whereby the walls of the same engage therewith.

5. An inkstand consisting of an interiorly-cylindrical vertical reservoir, and a hollow cylindrical air-filled float mounted therein and closely fitting said reservoir, and adapted to move vertically therein, and consisting of an outer tube, the upper end of which is closed by a conical cap, the base of which extends upwardly, and the apex of which extends downwardly and inwardly and is provided with a tubular extension which projects downwardly and centrally through said outer tube, said outer and inner tubes being each open at the bottom, the longitudinal and lateral dimensions of the float being substantially equal to the corresponding dimensions of the interior of the reservoir, substantially as shown and described.

6. An inkstand consisting of an interiorly-cylindrical vertical reservoir, and a hollow cylindrical air-filled float mounted therein and closely fitting said reservoir, and adapted to move vertically therein, and consisting of an outer tube, the upper end of which is closed by a conical cap, the base of which extends upwardly, and the apex of which extends downwardly and inwardly and is provided with a tubular extension which projects downwardly and centrally through said outer tube, said outer and inner tubes being each open at the bottom, the longitudinal and lateral dimensions of the float being substantially equal to the corresponding dimensions of the interior of the reservoir, and said reservoir being provided at the top thereof with an annular overflow-chamber, the inner wall of which is formed by said float, substantially as shown and described.

7. In an inkstand the combination with a reservoir wholly open at the top, and interiorly cylindrical, of an exteriorly-cylindrical hollow air-filled float, having a central vertical delivery, said float laterally fitting the walls of the reservoir, and longitudinally formed so that when resting upon the bottom of the reservoir it will project above the top of the same, the upper end of said float being provided with an annular flange whereby the upper portion of said float and said flange conjunctively form the closure of the open top of the reservoir.

8. An inkstand consisting of two parts one adapted to receive the other within it, the same being wholly open at one end and closed at the other, said part forming the ink-reservoir, and the other part of the device being formed to telescope within said first part or reservoir, and closely fit the wall thereof, said part being of a length corresponding with the depth of the reservoir and being provided with a flange to limit the telescoping of the parts and permit their mutual detachment, said inner part being adapted to deliver or supply the ink, and being formed into a funnel at the top, into a float throughout its length, and into a tube throughout its center.

9. In an inkstand the combination with a float of the character described, of a reservoir formed to receive the said float within it, and to closely surround the same, said reservoir being provided with a base on which said float is adapted to rest, and extending approximately to the top of said float, said reservoir being of a uniform width throughout the major portion of its interior, and being of an increased width at the top thereof to form a vertical annular groove or recess itself of uniform width, said upper recessed portion of the reservoir being wholly open at the top to permit the free insertion and removal of the float.

In testimony that I claim the foregoing as my invention I have signed my name, in presence of the subscribing witnesses, this 18th day of June, 1897.

EMRY DAVIS.

Witnesses:
C. GERST,
A. C. VAN BLARCOM.